(12) United States Patent
Jaramillo

(10) Patent No.: US 7,992,892 B2
(45) Date of Patent: Aug. 9, 2011

(54) INFLATABLE RAMP FOR INFLATABLE CURTAIN SIDE IMPACT RESTRAINT

(75) Inventor: Jamison Jaramillo, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 182 days.

(21) Appl. No.: 12/394,541

(22) Filed: Feb. 27, 2009

(65) Prior Publication Data

US 2010/0219620 A1  Sep. 2, 2010

(51) Int. Cl.
    *B60R 21/213* (2006.01)
(52) U.S. Cl. .......... 280/729; 280/730.2; 280/743.1
(58) Field of Classification Search .......... 280/730.2, 280/729, 743.1
    See application file for complete search history.

(56) References Cited

U.S. PATENT DOCUMENTS

| | | | | |
|---|---|---|---|---|
| 5,575,497 A * | 11/1996 | Suyama et al. | ........... | 280/730.1 |
| 6,158,767 A * | 12/2000 | Sinnhuber | ........... | 280/730.2 |
| 6,305,707 B1 | 10/2001 | Ishiyama et al. | | |
| 6,457,740 B1 * | 10/2002 | Vaidyaraman et al. | ... | 280/730.2 |
| 6,481,743 B1 * | 11/2002 | Tobe et al. | ........... | 280/728.2 |
| 6,830,262 B2 * | 12/2004 | Sonnenberg et al. | ...... | 280/730.2 |
| 7,185,914 B2 | 3/2007 | Recker et al. | | |
| 7,338,070 B2 * | 3/2008 | Madasamy et al. | ....... | 280/730.2 |
| 7,390,016 B2 * | 6/2008 | Noguchi et al. | ........... | 280/730.2 |
| 7,401,805 B2 | 7/2008 | Coon et al. | | |
| 7,500,694 B2 * | 3/2009 | Heudorfer et al. | ........... | 280/729 |
| 2003/0116947 A1 * | 6/2003 | Yokoyama et al. | ........ | 280/730.2 |
| 2003/0178831 A1 * | 9/2003 | Roberts et al. | ........... | 280/743.1 |
| 2004/0007857 A1 * | 1/2004 | Sonnenberg et al. | ...... | 280/730.2 |
| 2004/0066022 A1 * | 4/2004 | Mori et al. | ........... | 280/730.1 |
| 2004/0232666 A1 * | 11/2004 | Sato et al. | ........... | 280/730.2 |
| 2006/0061071 A1 * | 3/2006 | Noguchi et al. | ........... | 280/730.2 |
| 2007/0267852 A1 * | 11/2007 | Enders | ........... | 280/730.1 |
| 2008/0012275 A1 * | 1/2008 | Pinsenschaum et al. | .. | 280/730.2 |
| 2008/0018079 A1 * | 1/2008 | Mori et al. | ........... | 280/728.1 |
| 2009/0014989 A1 * | 1/2009 | Henderson et al. | ........ | 280/730.2 |
| 2010/0090448 A1 * | 4/2010 | Pursche et al. | ........... | 280/730.2 |
| 2010/0276915 A1 * | 11/2010 | Breuninger et al. | ......... | 280/729 |

* cited by examiner

*Primary Examiner* — Paul N Dickson
*Assistant Examiner* — Karen A Beck

(57) ABSTRACT

A curtain airbag for use in a vehicle having an interstitial volume includes a primary inflatable portion and an inflatable guide pocket. The primary inflatable portion has an aperture, and the inflatable guide pocket is attached to the primary inflatable portion by at least a first seam that at least partially circumscribes the aperture. The guide pocket is sized and configured to define a localized projection into the interstitial volume when the guide pocket and the primary inflatable portion are at least partially inflated.

28 Claims, 7 Drawing Sheets

_US 7,992,892 B2_

INFLATABLE RAMP FOR INFLATABLE CURTAIN SIDE IMPACT RESTRAINT

FIELD OF THE INVENTION

The invention relates to the field of inflatable restraints for automobiles, and more particularly, to an inflatable ramp for an inflatable curtain side impact restraint.

BACKGROUND

Inflatable restraint devices commonly called airbags are standard equipment on most new vehicles. Initially, vehicles were equipped with airbags that would deploy from forward-facing regions such as the steering wheel and the passenger side of the instrument panel. As consumers' concerns for safety have increased, additional airbags have been employed in different areas of the vehicle. Side-curtain airbags have been proposed to compensate for the lack of a crush zone and energy dissipation capacity in the sides of vehicles. Side-curtain airbags have been employed or stored in areas of the roof rail and headliners or in the side doors. These airbag devices are typically concealed from occupant view by interior trim panels associated with the roof rod and/or headliner.

Because side curtain airbags are disposed under or adjacent to interior trim panels, there is a possibility that the airbag may become caught on an interior trim panel, preventing complete deployment of the side curtain airbag. Currently, vehicles including side curtain airbags include a guide feature that allow the side curtain airbags to inflate completely by guiding the inflating curtain past and over the B-pillar as the side curtain airbag pushes the headliner outward and out of the way of the side curtain airbag. In some vehicles, the guide feature is provided in the form of a sheet metal bracket or a plastic bracket that that bridges the top end of the B pillar. However, it would be desirable to eliminate the need to provide a separate bracket for this purpose.

SUMMARY

Inflatable ramps for inflatable curtain side impact restraints are taught herein. According to one embodiment, an airbag for use in a vehicle having an interstitial volume includes a primary inflatable portion and an inflatable guide pocket. The primary inflatable portion has an aperture, and the inflatable guide pocket is attached to the primary inflatable portion by at least a first seam that at least partially circumscribes the aperture. The guide pocket is sized and configured to define a localized projection into the interstitial volume when the guide pocket and the primary inflatable portion are at least partially inflated. The primary inflatable portion could define a curtain having an upper longitudinal edge that is connectable to the vehicle.

In one embodiment, the localized projection is sized and configured to deflect the primary inflatable portion away from the interstitial volume when the curtain airbag is deployed. The localized projection could include at least one flat surface. The at least one flat surface could be distal to the primary inflatable portion.

In certain embodiments, the localized projection is a polyhedron. In other embodiments, the localized projection is one of a sphere, cylinder and cone. In additional embodiments, the localized projection is a three-dimensional structure having at least one substantially arcuate surface.

In another embodiment, the curtain airbag includes an inflating fluid inlet to the first inflatable portion, wherein the aperture is sized and configured relative to the inlet so that the fluid inflates the guide pocket before the primary inflatable portion is substantially inflated.

In additional embodiments, the guide pocket includes at least one fold so that the guide pocket has a substantially flat disposition adjacent to the aperture before the guide pocket is inflated.

In other embodiments, the guide pocket is substantially smaller than the primary inflatable portion.

In some embodiments, the interstitial volume is located in a gap between a structural pillar and trim mounted about the structural pillar. In other embodiments, the interstitial volume defines a plurality of interstitial surfaces, and when the guide pocket is inflated it defines one or more substantially flat surfaces that each engage with at least one of the plurality of interstitial surfaces to exclude the primary inflatable portion from the interstitial volume.

In certain embodiments, the first seam resists transmission of air. The first seam could be substantially airtight. Furthermore, the first seam could completely circumscribe the aperture.

In other embodiments, the primary inflatable portion has a first longitudinal length and the localized projection has a second longitudinal length, wherein the second longitudinal length is less than the first longitudinal length.

In further embodiments, the primary inflatable portion has a longitudinal inflation channel defined along an upper edge thereof, wherein the guide pocket is disposed adjacent to the longitudinal inflation channel.

In certain embodiments, the guide pocket is fabricated from a single, continuous expanse of material that is folded to lay substantially flat against the primary inflatable portion prior to inflation of the primary inflatable portion and the guide pocket. The guide pocket could be folded such that the guide pocket includes pleats that extend through the first seam.

BRIEF DESCRIPTION OF THE DRAWINGS

The description herein makes reference to the accompanying drawings wherein like referenced numerals refer to like parts throughout the several views, and wherein.

DETAILED DESCRIPTION

Figure 1:
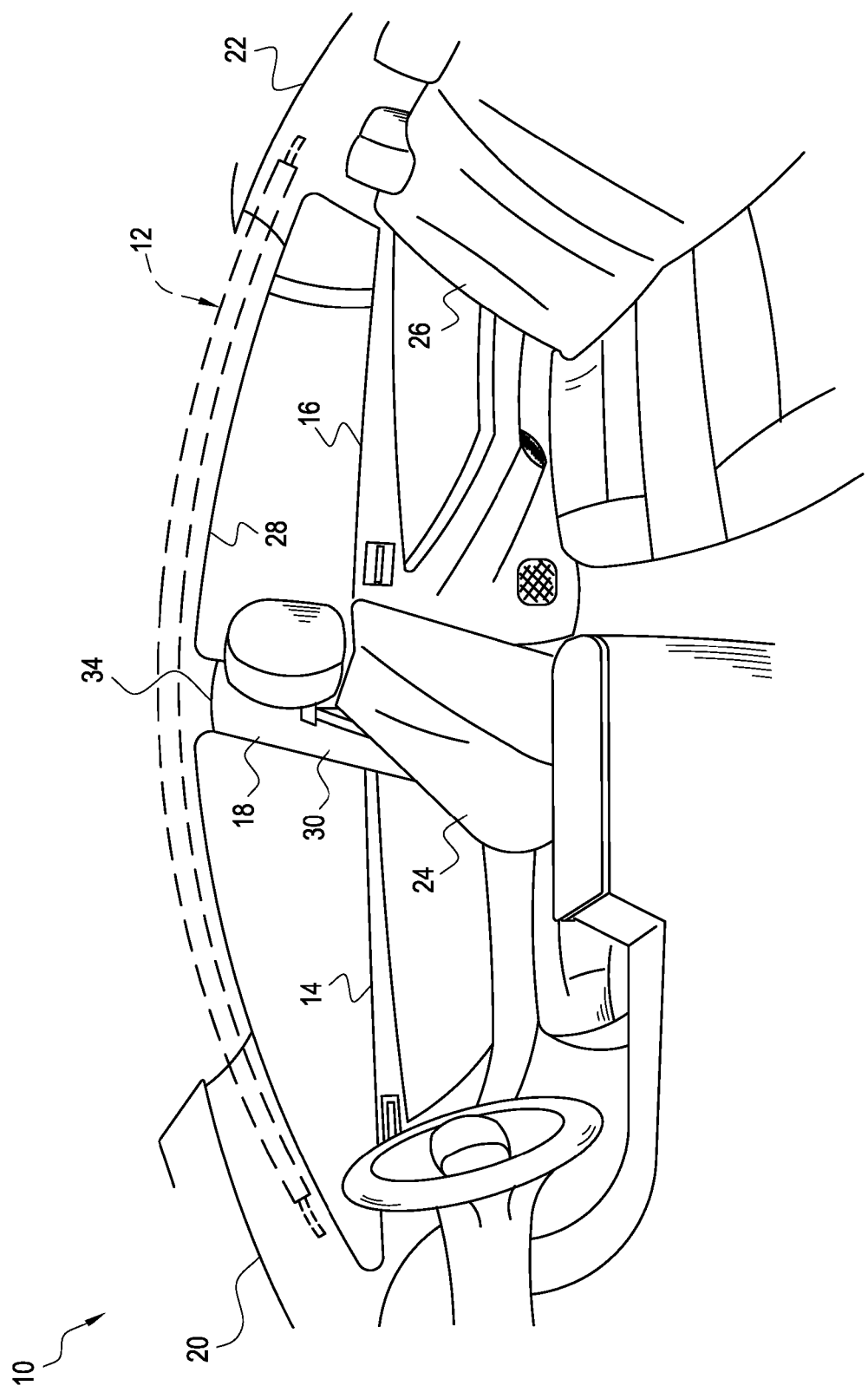
FIG. 1 is an illustration showing a vehicle equipped with a curtain airbag in accordance with a first embodiment of the invention.
Figure 2:
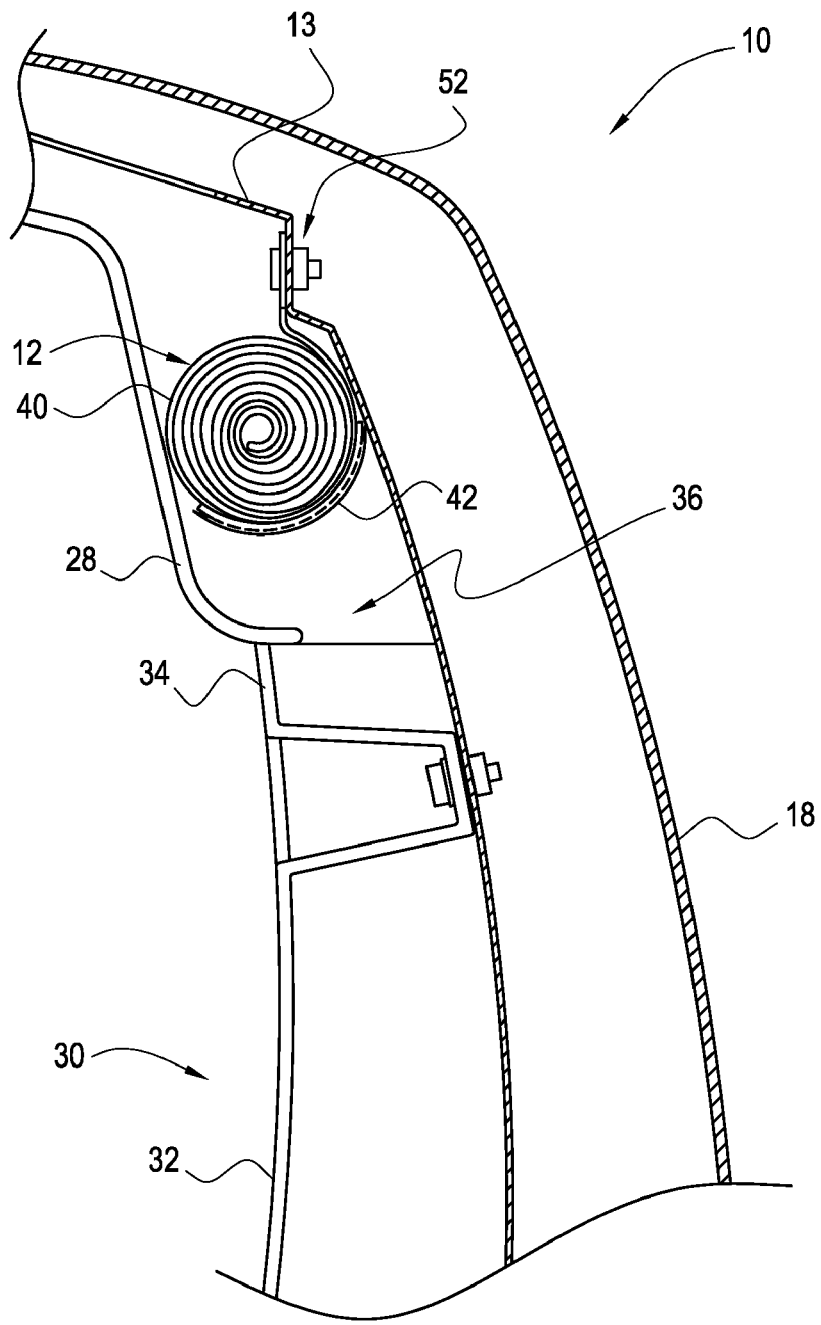
FIG. 2 is a front sectional view of the vehicle of FIG. 1 showing the curtain airbag in a pre-deployment position.
Figure 3:
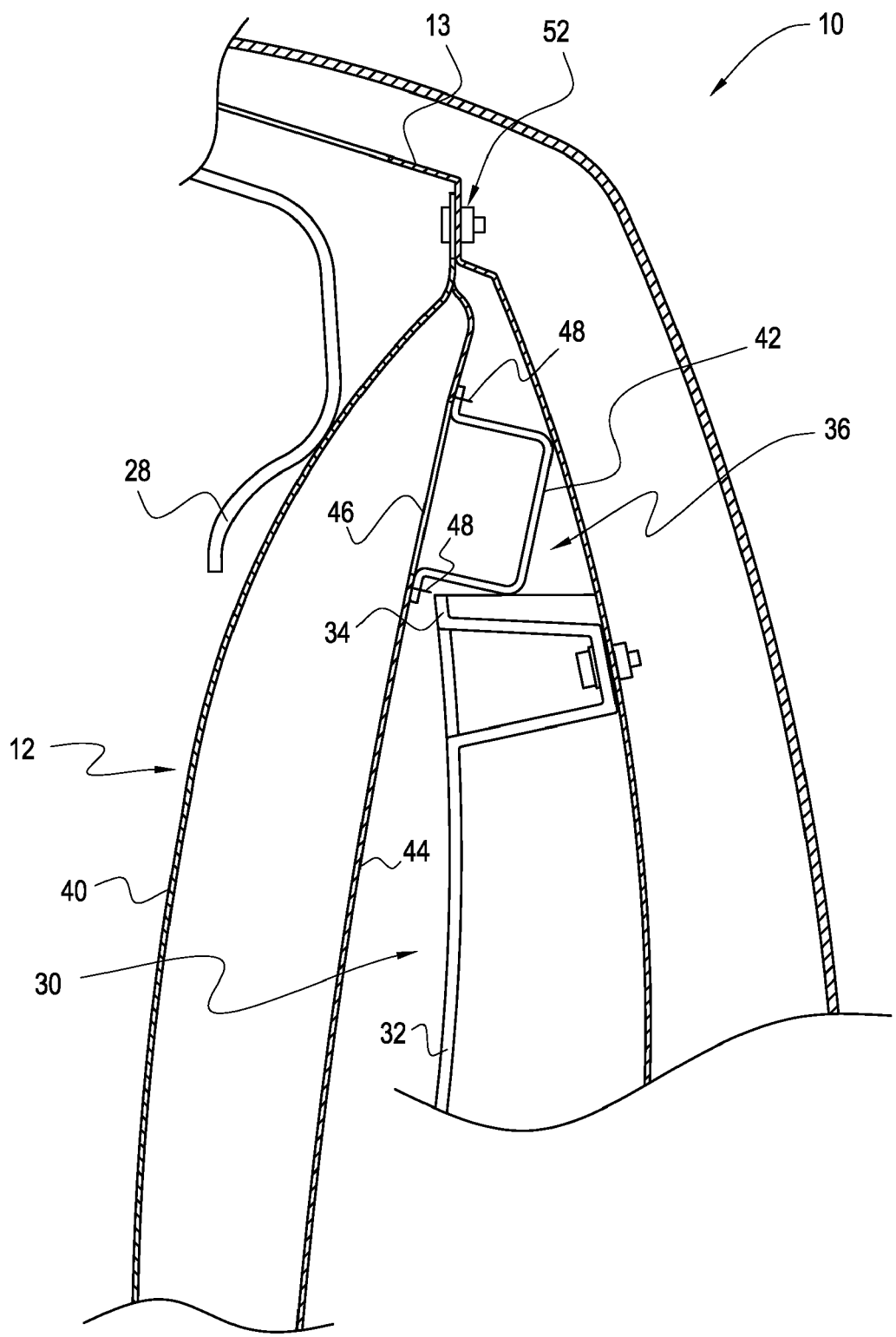
FIG. 3 is a front sectional view of the vehicle of FIG. 1 showing the curtain airbag during deployment.
Figure 4:
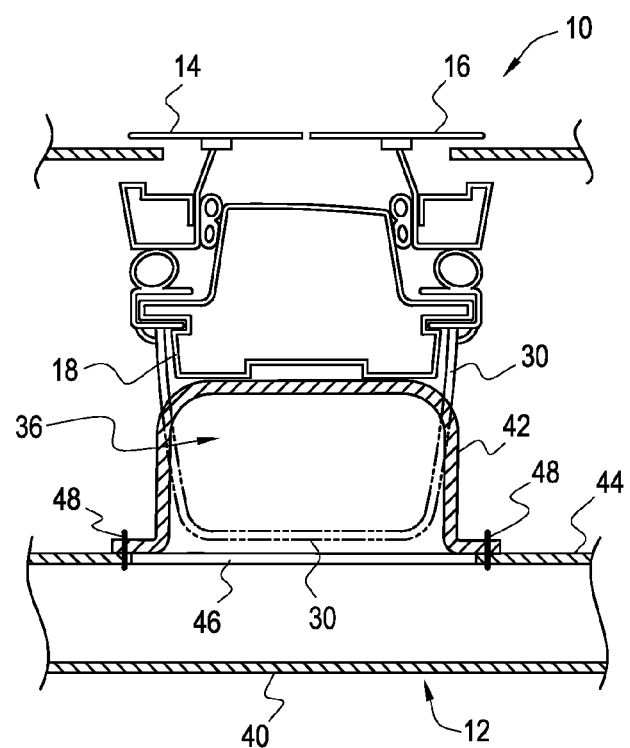
FIG. 4 is a top sectional view of the vehicle of FIG. 1 showing a structural pillar and a pillar trim panel of the vehicle, wherein the curtain airbag is in a deployed position.

FIGS. 1-4 show a vehicle 10 having a side impact restraint in the form of an inflatable curtain 12. The vehicle 10 may include a front door 14 and a rear door 16 that are separated from one another by an interior structural pillar or B-pillar 18 of the vehicle 1. A front structural pillar or A-pillar 20 is disposed forward of the front door 14. A rear structural pillar or C-pillar 22 is disposed rearward of the rear door 16. Front seats 24 are positioned adjacent to the front door 14, while rear seats 26 are positioned adjacent to the rear door 16. Of course, the vehicle 10 shown and described herein is not limiting of the invention, and the inflatable curtain 12 could be used with other vehicles 10, such as vehicles 10 that do not include a rear door 16 but include rear seats 26, or vehicles that lack both a rear door 16 and rear seats 26.

The inflatable curtain 12 is configured to inflate in response to impact of the vehicle 10 with an external object (not shown) to restrain motion of the occupants of the vehicle 10 with respect to the vehicle 10 and to provide some protection to the vehicle's occupants from the force of the impact. Prior to deployment, the inflatable curtain 12 is disposed at least partially behind a headliner 28 of the vehicle 1, in a pre-deployment position of the inflatable curtain 12. The inflatable curtain 12 extends underneath the headliner 28 along the longitudinal direction of the vehicle 10, just above the front door 14 and the rear door 16 as well as the B-pillar 18. The inflatable curtain 12 may extend at least partially along the length of both the A-pillar 20 and the C-pillar 22 of the vehicle 10.

To provide a finished appearance for the B-pillar 18 on the interior of the vehicle 10, a trim panel 30 is connected to and extends about the B-pillar 18. A front surface 32 of the trim panel 30 is disposed laterally inward from the B-pillar 18, such that an upper end 34 of the trim panel 30 and the B-pillar 18 cooperate to define a stepped configuration. The upper end 34 of the trim panel 30 abuts the headliner 28 and is disposed adjacent to the inflatable curtain 12 when the inflatable curtain 12 is in the pre-deployment position.

Because the upper end 34 of the trim panel 30 is spaced inward from the B-pillar 18, an interstitial volume 36 exists, which in this case is defined between the inflatable curtain 12, the upper end 34 of the trim panel 30, and the B-pillar 18 when the inflatable curtain 12 is in the deployed position. However, the interstitial volume 36 could be a gap or space defined by two or more structural and/or trim components which define surfaces on which the inflatable curtain 12 could become caught. Because the upper end 34 of the trim panel 30 is positioned inward from the B-pillar 18, and the inflatable curtain 12 is disposed directly above the upper end of the B-pillar 18, there is a chance that entry of the inflatable curtain 12 into the interstitial volume 36 during deployment of the inflatable curtain 12 could result in engagement of the inflatable curtain 12 with the upper end 34 of the trim panel 30, which could prevent proper, full deployment of the inflatable curtain 12.

In order to ensure full deployment of the inflatable curtain 12, the inflatable curtain 12 includes a primary inflatable portion 40 and a guide pocket 42. As will be explained in detail herein, the primary inflatable portion 40 of the inflatable curtain 12 provides impact protection during a collision, while the guide pocket 42 deflects the primary inflatable portion 40 of the inflatable curtain 12 away from the upper end 34 of the trim panel 30 such that the primary inflatable portion 40 of the inflatable curtain 12 is substantially excluded from the interstitial volume 36 during inflation of the inflatable curtain 12, and does not get caught on the upper end 34 of the trim panel 30. Thus, the guide pocket 42 prevents engagement of the primary inflatable portion 40 of the inflatable curtain 12 with the B-pillar 18 and the trim panel 30, which could prevent full deployment of the inflatable curtain 12.

The guide pocket 42 is provided on an outer surface 44 of the primary inflatable portion 40 adjacent to the B-pillar 18. To provide fluid communication between the primary inflatable portion 40 of the inflatable curtain 12 and the guide pocket 42, an aperture 46 is formed through the outer surface 44 of the primary inflatable portion 40, and the guide pocket 42 is attached to the primary inflatable portion 40 by a seam 48 that at least partially circumscribes the aperture 30 and could fully circumscribe the aperture 30. The seam 48 may be resistant to or substantially sealed against the transmission of air from the interior of the inflatable curtain 12 to the exterior thereof. The seam 48 may be provided by stitching, ultrasonic welding, adhesives, or other conventional methods that are suitable to provide an air resistant or substantially airtight interface between the primary inflatable portion 24 and the inflatable ramp 32.

Figure 5:
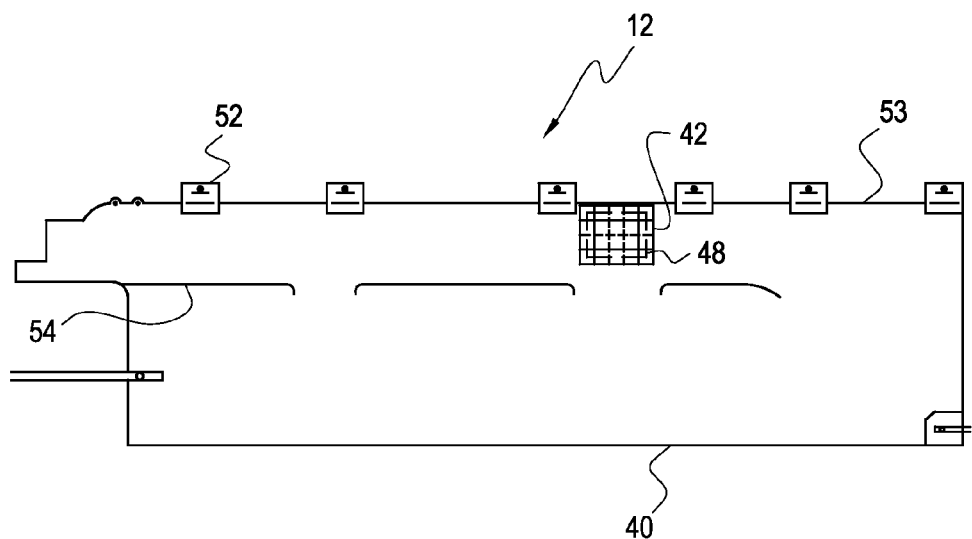
FIG. 5 is an illustration showing a side view of the curtain airbag.

As shown in FIG. 5, the guide pocket 42 is positioned near a fixed end 50 of the primary inflatable portion 40 of the inflatable curtain 12, wherein the fixed end 50 extends along the length of the vehicle 10 and is connected to a roof panel 13 of the vehicle 10 by mounting tabs 52. By positioning the guide pocket 42 adjacent to the fixed end 52 of the primary inflatable portion 40, the aperture 46 that provides inflation fluid to the guide pocket 42 is disposed along an inflation channel 54 of the primary inflatable portion 40, and thus, is inflated prior to full inflation of the inflatable curtain 10. However, the aperture can be provided and configured in other locations so that the fluid inflates the guide pocket 42 before the primary inflatable portion 40 of the inflatable curtain 12 is substantially inflated.

The guide pocket 42 is positioned such that it is engageable with surfaces that define the interstitial volume 36, such as the upper end 34 of the trim panel 30 and the B-pillar 18. During inflation of the inflatable curtain 12, the guide pocket 42 inflates to substantially fill the interstitial volume 36 and deflects the primary inflatable portion 40 of the inflatable curtain 12 away from the upper end 34 of the trim panel 30, thus ensuring that the primary inflatable portion 40 does not become caught upon the upper end 34 of the trim panel 30 or other surfaces defining the interstitial volume 36.

In order to do so, the guide pocket 42 defines a localized projection that extends outward from the outer surface 44 of the primary inflatable portion 40 of the inflatable curtain 12 and into the interstitial volume 36. The guide pocket 42 may, when inflated, extend substantially perpendicular to the primary inflatable portion 40 of the inflatable curtain 12. Furthermore, the guide pocket 42 may include one or more substantially planar surfaces, such as a distal engagement surface 56.

Figure 6:
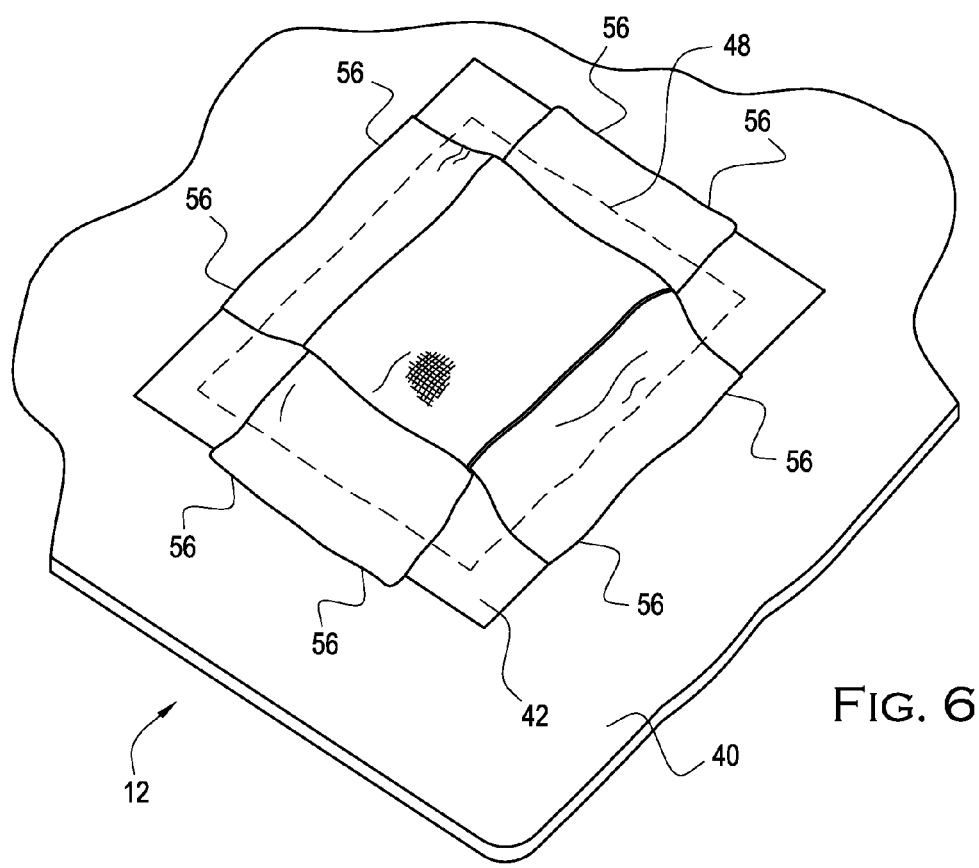
FIG. 6 is a perspective view showing an inflatable trim ramp in a folded position with respect to a primary inflatable portion of the curtain airbag.
Figure 7:
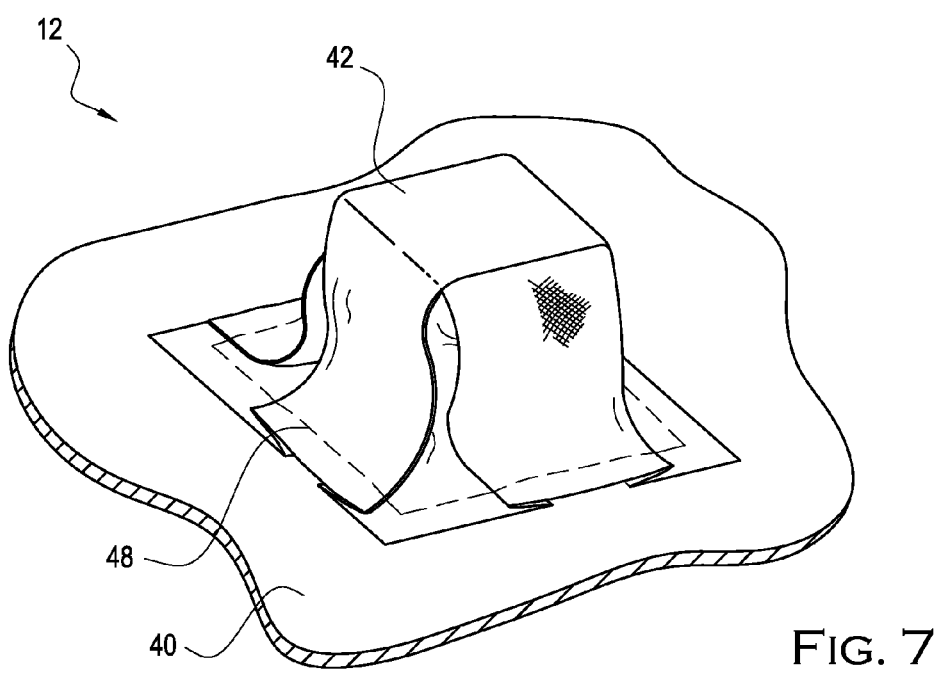
FIG. 7 is an illustration showing the inflatable trim ramp in an inflated position with respect to the primary inflatable portion of the curtain airbag.

The localized projection defined by the guide pocket 42 need only be sized and configured to exclude the primary inflatable portion 40 from the interstitial volume 36. It need not extend along the entire length of the primary inflatable portion 40 of the inflatable curtain 12 or the entire length of the trim panel 30. However, in order to dispose the inflatable curtain 10 behind the headliner 28 when the inflatable curtain 12 is in the pre-deployment position, the guide pocket 42 is configured to fold substantially flat adjacent the aperture 46 that is defined on the outer surface 44 of the primary inflatable portion 40 of the inflatable curtain 12, as shown in FIG. 6. In particular, the guide pocket 42, in the pre-deployment position, may include a plurality of folds, some of which extend through the seam 48 between the guide pocket 42 and the primary inflatable portion 40 to define pleats 56 at the periphery of the guide pocket 42. As shown in FIG. 7, the pleats 56 serve to define the structure of the guide pocket 42 in the deployed position, such that a three-dimensional, substantially cubic structure may be defined by the guide pocket 42.

Figure 8A:
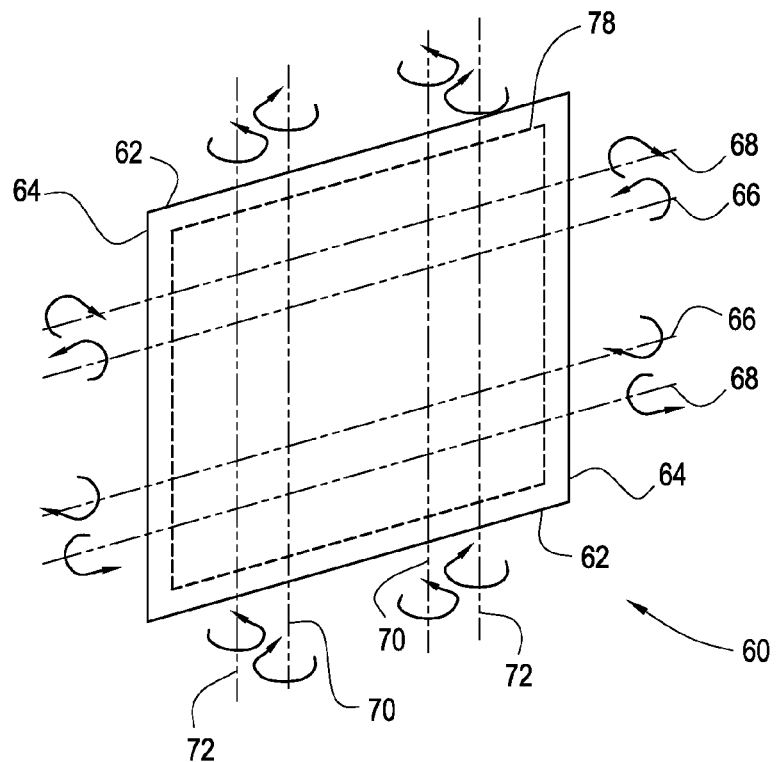
FIG. 8a is an illustration showing a sheet material from which the inflatable trim ramp is fabricated.

The guide pocket 42 may be fabricated by folding a sheet of material 60, as shown in FIG. 8a. The sheet of material 60 may be substantially rectangular or substantially square, having a first pair of opposed edges 62 and a second pair of opposed edges 64. As will be explained, folding of the material 60 is performed along a first pair of fold lines 66 and a second pair of fold lines 68 that extend substantially parallel to the first pair of opposed edges 62, as well as along a third pair of fold lines 70 and a fourth pair of fold lines 72 that extend substantially parallel to the second pair of opposed edges 64 of the material 60.

Figure 8B:
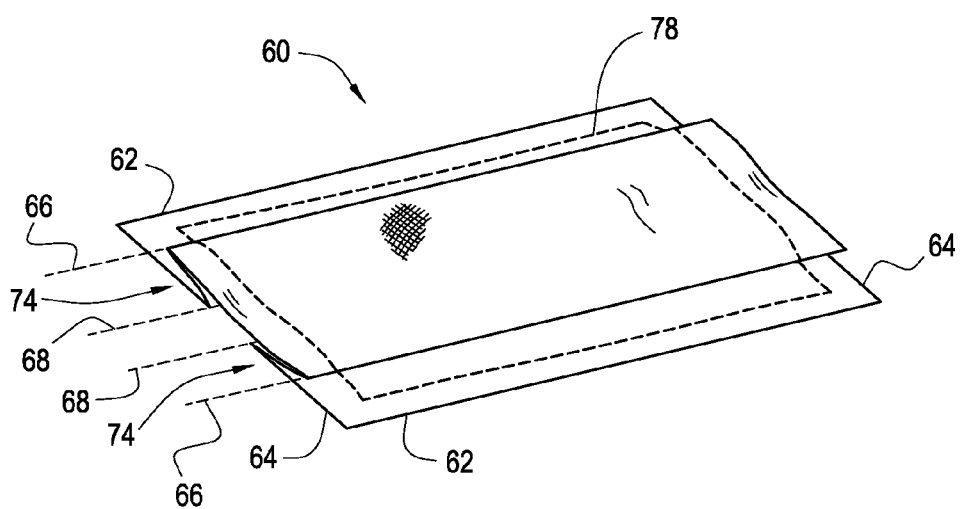
FIG. 8b is an illustration detailing the manner of folding the sheet material to provide the inflatable trim ramp, wherein the sheet material is partially folded.
Figure 8C:
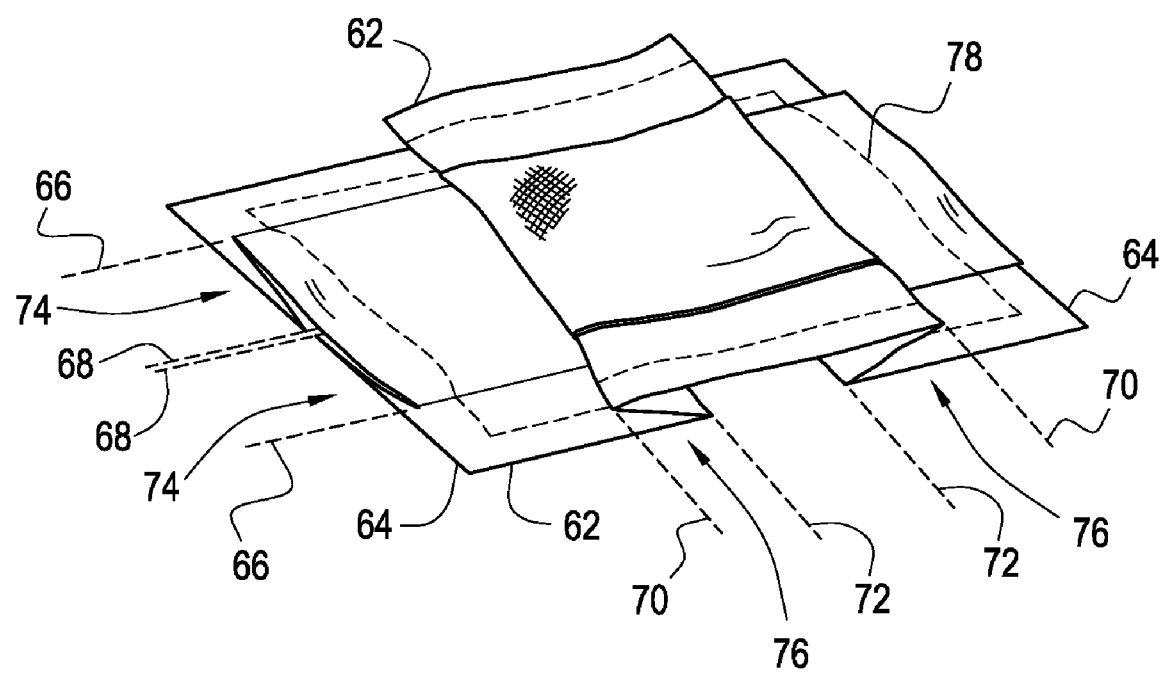
FIG. 8c is an illustration detailing the manner of folding the sheet material to provide the inflatable trim ramp, wherein the sheet material is fully folded.

As shown in FIG. 8b, the material 60 is first folded along each of the first pair of fold lines 66 to fold the opposed edges 62 inward toward the middle of the material 60. The material 60 is then folded along each of the second pair of fold lines 68 in an opposite direction to establish a first pair of opposed Z-shaped folds 74 at the second opposed edges 64 of the material 60, such that the Z-shaped folds 74 extend substantially parallel to the first pair of opposed edges 62 of the material 60. Then, as shown in FIG. 8c, the material 60 is folded along the third pair of fold lines 70 such that the second pair of opposed edges 64 are folded inward toward the middle of the sheet of material 60. The material 60 is then folded along the fourth pair of fold lines 72 in an opposite direction to establish a second pair of opposed Z-shaped folds 76 along the first pair of opposed edges 62 of the material 60 such that the Z-shaped folds 76 extend substantially parallel to the second pair of opposed edges 64 of the material 60. The sheet of material 60 may then be sewn to the primary portion 40 of the inflatable curtain 12 along a sew line 78 that is inset from the first and second pairs of opposed edges 62, 64 of the material 60 to establish the guide pocket 42 in the folded position, as shown in FIG. 5.

Although the guide pocket 42 has been described as being fabricated from a single sheet of material 60, it should be understood that the guide pocket 42 may be fabricated in other ways. Rather, the guide pocket 42 could be provided from a structure formed from multiple sections of material that are sewn together to form a structure that may be folded flat and subsequently inflated into a three-dimensional shape. Furthermore, although a substantially rectangular structure has been explicitly described herein, it will be appreciated by those of skill in the art that the guide pocket 42 could be provided in a variety of geometric shapes. For example, the guide pocket 42 could be a polyhedron.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An airbag for use in a vehicle having an interstitial volume, comprising:
    a primary inflatable portion having an aperture, wherein the primary inflatable portion defines a curtain having an upper longitudinal edge that is connectable to the vehicle; and
    an inflatable guide pocket attached to the primary inflatable portion by at least a first seam that at least partially circumscribes the aperture, with the guide pocket being disposed adjacent to the upper longitudinal edge of the primary inflatable portion,
    wherein the guide pocket is sized and configured to define a localized projection into the interstitial volume when the guide pocket and the primary inflatable portion are at least partially inflated, the guide pocket expands laterally away from the primary inflatable portion in an outboard direction of the vehicle during inflation of the airbag, the primary inflatable portion includes an outboard surface, the aperture is defined through the outboard surface of the primary inflatable portion, and the localized projection includes at least one flat surface that is spaced from the outboard surface of the primary inflatable portion in the outboard direction of the vehicle.

2. The airbag of claim 1, wherein the localized projection is sized and configured to deflect the primary inflatable portion away from the interstitial volume when the curtain airbag is deployed.

3. An airbag for use in a vehicle having an interstitial volume, comprising:
    a primary inflatable portion having an aperture, wherein the primary inflatable portion defines a curtain having an upper longitudinal edge that is connectable to the vehicle; and
    an inflatable guide pocket attached to the primary inflatable portion by at least a first seam that at least partially circumscribes the aperture, with the guide pocket being disposed adjacent to the upper longitudinal edge of the primary inflatable portion,
    wherein the guide pocket is sized and configured to define a localized projection into the interstitial volume when the guide pocket and the primary inflatable portion are at least partially inflated, the guide pocket expands laterally away from the primary inflatable portion in an outboard direction of the vehicle during inflation of the airbag, the guide pocket is fabricated from a single, continuous expanse of material that is folded to lay substantially flat against the primary inflatable portion prior to inflation of the primary inflatable portion and the guide pocket, and the guide pocket is folded such that the guide pocket includes pleats that extend through the first seam.

4. The airbag of claim 3, wherein the primary inflatable portion includes an outboard surface, the aperture is defined through the outboard surface of the primary inflatable portion, and the localized projection includes at least one flat surface that is spaced from the outboard surface of the primary inflatable portion in the outboard direction of the vehicle.

5. The airbag of claim 3, wherein the primary inflatable portion includes an outboard surface, the aperture is defined through the outboard surface of the primary inflatable portion, and the localized projection is a polyhedron that extends from the outboard surface of the primary inflatable portion in the outboard direction of the vehicle.

6. The airbag of claim 1, further comprising:
    an inflating fluid inlet to the primary inflatable portion that is in fluid communication with the guide pocket through the aperture, wherein the aperture is sized and configured relative to the inlet so that the fluid inflates the guide pocket before the primary inflatable portion is substantially inflated.

7. The airbag of claim 1, wherein the localized projection is a three-dimensional structure having at least one substantially arcuate surface.

8. The airbag of claim 1, wherein the guide pocket includes at least one fold so that the guide pocket has a substantially flat disposition adjacent to the aperture before the guide pocket is inflated.

9. The airbag of claim 1, wherein the interstitial volume is a gap that is located adjacent to a structural pillar and a top end of a trim panel that is mounted to the structural pillar.

10. The airbag of claim 3, wherein the interstitial volume defines a plurality of interstitial surfaces, and wherein when the guide pocket is inflated it defines one or more substantially flat surfaces that each engage with at least one of the plurality of interstitial surfaces to exclude the primary inflatable portion from the interstitial volume.

11. The airbag of claim 1, wherein the first seam resists transmission of air.

12. An airbag for use in a vehicle having an interstitial volume, comprising:
a primary inflatable portion having an aperture, wherein the primary inflatable portion defines a curtain having an upper longitudinal edge that is connectable to the vehicle; and
an inflatable guide pocket attached to the primary inflatable portion by at least a first seam that at least partially circumscribes the aperture, with the guide pocket being disposed adjacent to the upper longitudinal edge of the primary inflatable portion,
wherein the guide pocket is sized and configured to define a localized projection into the interstitial volume when the guide pocket and the primary inflatable portion are at least partially inflated, the guide pocket expands laterally away from the primary inflatable portion in an outboard direction of the vehicle during inflation of the airbag, and the first seam completely circumscribes the aperture.

13. The airbag of claim 1, further comprising:
the primary inflatable portion having a first longitudinal length; and
the localized projection having a second longitudinal length, wherein the second longitudinal length is less than the first longitudinal length.

14. The airbag of claim 1, further comprising:
the primary inflatable portion having a longitudinal inflation channel defined along an upper edge thereof, wherein the guide pocket is disposed adjacent to the longitudinal inflation channel and is in fluid communication with the longitudinal inflation channel through the aperture.

15. The airbag of claim 1, wherein the guide pocket is fabricated from a single, continuous expanse of material that is folded to lay substantially flat against the primary inflatable portion prior to inflation of the primary inflatable portion and the guide pocket.

16. The airbag of claim 3, wherein the localized projection includes at least one flat surface that is spaced from the primary inflatable portion in the outboard direction of the vehicle.

17. An airbag for use in a vehicle having a door, a structural pillar adjacent to the door, and a trim panel connected to the structural pillar, wherein the airbag is connectable to the vehicle above the door and the structural pillar, the airbag comprising:

a primary inflatable portion having an upper longitudinal edge connectable to the vehicle, an interior surface adapted to face a passenger compartment of the vehicle when the primary inflatable portion is inflated, an exterior surface adapted to face the door and the structural pillar when the primary inflatable portion is inflated, and an aperture defined through the exterior surface; and
an inflatable guide pocket attached to the exterior surface of the primary inflatable portion by at least a first seam that at least partially circumscribes the aperture,
wherein the guide pocket is disposed above an upper end of the trim panel and is sized and configured to define a localized projection that is engageable with at least one of the structural pillar and the upper end of the trim panel when the guide pocket and the primary inflatable portion are at least partially inflated.

18. An airbag for use in a vehicle having a door, a structural pillar adjacent to the door, and a trim panel connected to the structural pillar, wherein the airbag is connectable to the vehicle above the door and the structural pillar, the airbag comprising:
a primary inflatable portion having an upper longitudinal edge connectable to the vehicle, an interior surface adapted to face a passenger compartment of the vehicle when the primary inflatable portion is inflated, an exterior surface adapted to face the door and the structural pillar when the primary inflatable portion is inflated, and an aperture defined through the exterior surface; and
an inflatable guide pocket attached to the exterior surface of the primary inflatable portion by at least a first seam that at least partially circumscribes the aperture,
wherein the guide pocket is sized and configured to define a localized projection that is engageable with at least one of the structural pillar and an upper end of the trim panel when the guide pocket and the primary inflatable portion are at least partially inflated and the localized projection has a fore-to-aft width complementary to a fore-to-aft width of the structural pillar.

19. The airbag of claim 17, wherein the structural pillar is a B-pillar.

20. The airbag of claim 1, wherein the guide pocket is folded such that it retains a predetermined shape that resists deformation before the guide pocket is inflated.

21. The airbag of claim 1, wherein the guide pocket is folded such that it occupies a surface area on the primary inflatable portion substantially equal to a surface area of the aperture before the guide pocket is inflated.

22. An airbag for use in a vehicle having an interstitial volume, comprising:
a primary inflatable portion having an aperture, wherein the primary inflatable portion defines a curtain having an upper longitudinal edge that is connectable to the vehicle; and
an inflatable guide pocket attached to the primary inflatable portion by at least a first seam that at least partially circumscribes the aperture, with the guide pocket being disposed adjacent to the upper longitudinal edge of the primary inflatable portion,
wherein the guide pocket is sized and configured to define a localized projection into the interstitial volume when the guide pocket and the primary inflatable portion are at least partially inflated, the guide pocket expands laterally away from the primary inflatable portion in an outboard direction of the vehicle during inflation of the airbag, the guide pocket is fabricated from a single, continuous expanse of material that is folded to lay substantially flat against the primary inflatable portion prior to inflation of the primary inflatable portion and the guide pocket, and the guide pocket is folded to define a first pleat and a second pleat that crosses the first pleat.

23. The airbag of claim 22, wherein the first pleat and the second pleat each extend through the first seam such that the first pleat and the second pleat are restrained against unfolding at the first seam when the guide pocket is inflated.

24. The airbag of claim 22, wherein the first pleat extends substantially perpendicular to the second pleat.

25. The airbag of claim 22, wherein the first pleat and the second pleat are each defined by a z-shaped fold.

26. The airbag of claim 15, wherein the guide pocket is folded to define a first pair of pleats that extend in a first direction and a second pair of pleats that extend in a second direction and cross the first pair of pleats.

27. The airbag of claim 17, wherein the guide pocket is folded such that it retains a predetermined shape that resists deformation before the guide pocket is inflated.

28. The airbag of claim 17, wherein the guide pocket is folded such that it occupies a surface area on the primary inflatable portion substantially equal to a surface area of the aperture before the guide pocket is inflated.

* * * * *